(12) United States Patent
Matsumoto

(10) Patent No.: US 6,345,121 B1
(45) Date of Patent: Feb. 5, 2002

(54) IMAGE ENCODING APPARATUS AND AN IMAGE DECODING APPARATUS

(75) Inventor: Taisuke Matsumoto, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/091,922

(22) PCT Filed: Nov. 6, 1997

(86) PCT No.: PCT/JP97/04034

§ 371 Date: Jun. 25, 1998

§ 102(e) Date: Jun. 25, 1998

(30) Foreign Application Priority Data

Nov. 7, 1996 (JP) ................................. 8-294737

(51) Int. Cl.⁷ ................................. G06K 9/36
(52) U.S. Cl. ................ 382/232; 382/236; 382/243; 702/181
(58) Field of Search ................ 382/232, 236, 382/238, 247, 243; 375/240.04; 702/181

(56) References Cited

U.S. PATENT DOCUMENTS

| | | | |
|---|---|---|---|
| 4,494,108 A | * 1/1985 | Langdon, Jr. et al. | 340/347 DD |
| 5,099,440 A | * 3/1992 | Pennebaker et al. | 364/554 |
| 5,136,396 A | 8/1992 | Kato et al. | 358/426 |
| 5,241,383 A | * 8/1993 | Chen et al. | 358/136 |
| 5,305,104 A | * 4/1994 | Jensen et al. | 348/473 |
| 5,331,426 A | 7/1994 | Kato et al. | 358/426 |
| 5,473,378 A | * 12/1995 | Tamitani | 348/416 |
| 5,481,553 A | * 1/1996 | Suzuki et al. | 371/49.1 |
| 5,588,069 A | 12/1996 | Katayama et al. | 382/166 |
| 5,590,139 A | * 12/1996 | Suzuki et al. | 371/49.1 |
| 5,737,022 A | * 4/1998 | Yamaguchi et al. | 348/416 |
| 5,912,636 A | * 6/1999 | Gormish et al. | 341/50 |
| 5,959,672 A | * 9/1999 | Sasaki | 348/390 |
| 5,982,437 A | * 11/1999 | Okazaki et al. | 348/413 |
| 6,025,932 A | * 2/2000 | Imanaka | 358/426 |
| 6,064,774 A | * 5/2000 | Takatsu et al. | 382/245 |
| 6,078,615 A | * 6/2000 | Yamamoto et al. | 375/240 |
| 6,205,287 B1 | * 3/2001 | Takahashi et al. | 386/111 |

FOREIGN PATENT DOCUMENTS

| | | | |
|---|---|---|---|
| EP | 0357388 | 3/1990 | ........... H04N/1/417 |
| EP | 0491556 | 6/1992 | ........... H04N/1/41 |
| EP | 876058 | 11/1998 | ........... H04N/7/26 |
| JP | 59181777 | 10/1984 | ........... H04N/1/41 |
| JP | 2-65372 | 3/1990 | ........... H04N/1/417 |
| JP | 4-217176 | 8/1992 | ........... H04N/1/41 |

OTHER PUBLICATIONS

MPEG 4 Standard, ISO/IEC JTC1/SC29/WG11 N1277, Jul. 1996, entitled "Coding of Moving Pictures And Associated Audio Information".
English Language Abstract of JP No. 4–217176.
English Language Abstract of JP No. 59–181777.
English Language Abstract of JP No. 2–65372.

* cited by examiner

Primary Examiner—Jose L. Couso
Assistant Examiner—Anh Hong Do
(74) Attorney, Agent, or Firm—Greenblum & Bernstein, P.L.C.

(57) ABSTRACT

The mode data of a block to be coded is predicted from the mode data of peripheral blocks already coded, and coded using a code word table switched according to a hitting ratio of prediction. In the code word table, the code word length is set shorter for coding modes with high hitting ratio.

7 Claims, 14 Drawing Sheets

FIG. 3

| MODE DATA OF CODED PERIPHERAL BLOCK | | | CODE WORD OF MODE(i,j) | | |
|---|---|---|---|---|---|
| MODE(i−1,j) | MODE(i−1,j−1) | MODE(i,j−1) | A | B | C |
| A | A | A | 0 | 10 | 11 |
| A | A | B | | | |
| A | B | A | | | |
| A | A | C | | | |
| A | C | A | | | |
| B | A | A | | | |
| C | A | A | | | |
| A | B | C | | | |
| A | C | B | | | |
| B | B | B | 10 | 0 | 11 |
| B | B | A | | | |
| B | A | B | | | |
| B | B | C | | | |
| B | C | B | | | |
| A | B | B | | | |
| C | B | B | | | |
| B | A | C | | | |
| B | C | A | | | |
| C | C | C | 10 | 11 | 0 |
| C | C | A | | | |
| C | A | C | | | |
| C | C | B | | | |
| C | B | C | | | |
| A | C | C | | | |
| B | C | C | | | |
| C | A | B | | | |
| C | B | A | | | |

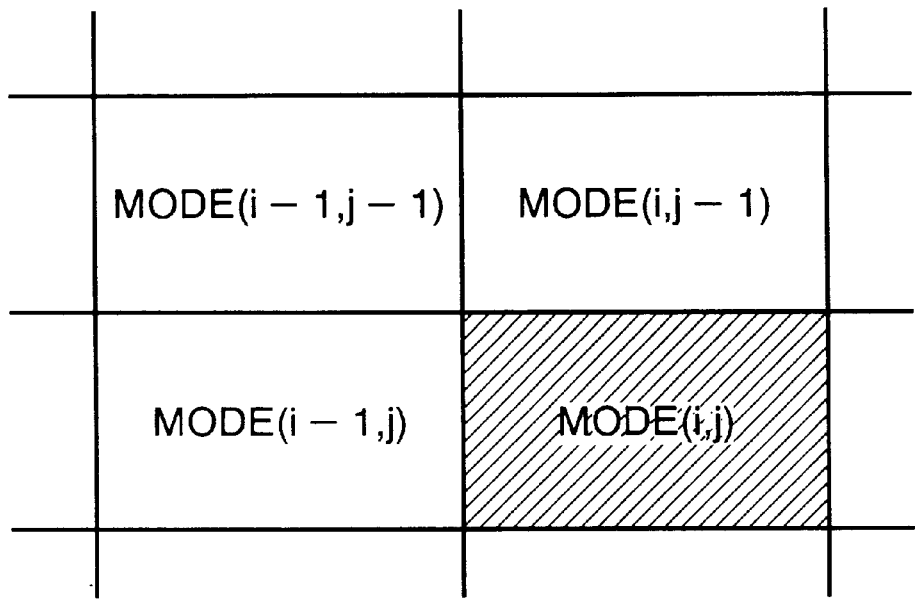

FIG. 7A

| | 0 | 1 | 0 | 1 | 0 | 1 | 0 | | 0 | | 0 |
|---|---|---|---|---|---|---|---|---|---|---|---|
| | 0 | 1 | 0 | 1 | 1 | 1 | 1 | 1 | 1 | 1 | 0 |
| 1 | 0 | ///| 0 | 1 | 1 | ///| 0 | 1 | 1 | ///| 0 |
| 1 | 0 | ///| 0 | 1 | 1 | ///| 0 | ///| 0 | ///| 0 |
| 1 | 1 | 1 | 1 | ///| 0 | ///| 0 | ///| 0 | ///| 0 |

| | 0 | 1 | 0 | 1 | 0 | 1 | 0 | | 0 | | 0 |
|---|---|---|---|---|---|---|---|---|---|---|---|
| | 0 | 1 | 0 | 1 | 1 | 1 | 1 | 1 | 0 | 1 | 0 |
| 1 | 0 | 1 | 0 | 1 | 1 | 1 | 1 | 1 | 0 | 1 | 0 |
| 1 | 0 | 1 | 0 | 1 | 1 | 1 | 1 | 1 | 1 | 1 | 1 |
| 1 | 1 | 1 | 1 | 1 | 1 | 1 | 1 | 1 | 1 | 1 | 1 |

FIG. 11

| MODE DATA | | CODE WORD |
|---|---|---|
| MODE(i,j) | MODE(i+1,j) | |
| A | A | 0 |
| A | B | 0110 |
| A | C | 0111110 |
| B | A | 011101 |
| B | B | 001 |
| B | C | 01111110 |
| C | A | 011110 |
| C | B | 01111111 |
| C | C | 010 |

FIG. 12

| | | | |
|---|---|---|---|
| LINE 1 | (A B) | (B B) | (A A) |
| LINE 2 | (A B) | (C C) | (B B) |
| LINE 3 | (B B) | (C C) | (B B) |
| LINE 4 | (B B) | (C C) | (C B) |
| LINE 5 | (C C) | (C C) | (C C) |

FIG. 13A

| | | | | |
|---|---|---|---|---|
| LINE 1 | (0110) | (001) | (0) | |
| LINE 2 | (0110) | (010) | (001) | |
| LINE 3 | (001) | (010) | (001) | ⇒ 50bit |
| LINE 4 | (001) | (010) | (01111111) | |
| LINE 5 | (010) | (010) | (010) | |

FIG. 13B

| | | | | |
|---|---|---|---|---|
| LINE 1 | (0 : 10) | (10 : 10) | (0 : 0) | |
| LINE 2 | (0 : 10) | (11 : 11) | (10 : 10) | |
| LINE 3 | (10 : 10) | (11 : 11) | (10 : 10) | ⇒ 56bit |
| LINE 4 | (10 : 10) | (11 : 11) | (11 : 10) | |
| LINE 5 | (11 : 11) | (11 : 11) | (11 : 11) | |

CONCEPTUAL DIAGRAM OF ARITHMETIC CODING

| SET NO. \ APPEARANCE PROBABILITY | A | B | C |
|---|---|---|---|
| No1 | 70 | 20 | 10 |
| No2 | 20 | 70 | 10 |
| No3 | 20 | 10 | 70 |

IMAGE ENCODING APPARATUS AND AN IMAGE DECODING APPARATUS

TECHNICAL FIELD

The present invention relates to an image coding apparatus and an image decoding apparatus for coding and decoding digital images, and also relates to recording media in which image coding/decoding programs are stored.

BACKGROUND ART

One of known conventional image coding systems requiring reversibility is the MMR (Modified Modified Read) system which is used in facsimile applications. However, since the MMR system is a system in which processing is performed for the entire one frame input, it is difficult to maintain consistency with another coding system adopted in ITU-T H.261 and ISO/IEC MPEG, etc. in which one frame is divided into a plurality of blocks and processing is performed in block units. Thus, the MMMR (Modified MMR) that is an improved version of the MMR system is adopted as an verification model of MPEG4 (ISO/IECJTC/SC29/WG11 N1277, July 1996).

An image coding system which divides a one-frame image into two-dimensional blocks consisting of a plurality of pixels and codes the image for each block, performs coding by dividing data into two parts: one is coding mode data which indicates whether or not block movement is corrected for each block, presence or absence of a quadrature conversion coefficient and whether or not a block has significance in the case that the input image is a form image which indicates the form and synthesis ratio of the object, etc., and the method for coding pixel values within the block, and the other is coding data of the pixel values within the block.

However, the coding method that performs coding by dividing the above image block into the coding mode data that indicates the coding mode of said block and the data concerning the pixel values within said block has the problem that the percentage of the block mode data in the created coded signal relatively increases, deteriorating its coding efficiency in the case that blocks without movement information, quadrature conversion coefficient or significant form, etc. increases within one frame.

DISCLOSURE OF INVENTION

The objective of the present invention is to provide an image coding apparatus and image decoding apparatus that will prevent the coding efficiency from drastically deteriorating even for those images that contain numerous blocks without movement information, quadrature conversion coefficient or significant form, etc. within one frame.

The image coding apparatus of the first invention is an image coding apparatus that, when coding the mode data, predicts the coding mode of a block to be coded from the mode data of already coded peripheral blocks and switches a code word table that specifies code words according to the hitting ratio of prediction.

The image decoding apparatus of the second invention is an image decoding apparatus that, when decoding the mode data, predicts the coding mode of a block to be decoded from the mode data of already decoded peripheral blocks and switches a code word table that specifies code words according to the hitting ratio of prediction.

The first and second inventions can improve the coding efficiency by shortening the code word length of a coding mode with high hitting ratio.

The image coding apparatus of a third invention is an image coding apparatus that collectively codes the coding mode data corresponding to a plurality of blocks for a digital image which has been divided into those blocks.

The image decoding apparatus of the fourth invention is an image decoding apparatus that collectively decodes code words regarding the mode data corresponding to a plurality of blocks.

The third and fourth inventions can easily perform coding/decoding using a correlation between blocks of the mode data, thus improving coding efficiency.

The image coding apparatus of the fifth invention is an image coding apparatus that, when coding the mode data, predicts the coding mode of a block to be coded from the mode data of already coded peripheral blocks and switches a probability model that specifies appearance probability according to the hitting ratio of prediction.

The image decoding apparatus of the sixth invention is an image decoding apparatus that, when performing arithmetic decoding of mode data, predicts the coding mode of a block to be decoded from the mode data of already decoded peripheral blocks and switches a probability model that specifies appearance probability according to the hitting ratio of prediction.

The fifth and sixth inventions can perform arithmetic coding/decoding by predicting a coding mode and adaptively switching to a probability model for which a coding mode with high appearance probability is set, thus improving coding efficiency.

The recording medium of the seventh invention is a computer recording medium that stores the program data that implements at least one of the image coding apparatus/image decoding systems that relate to the first to sixth inventions.

BRIEF DESCRIPTION OF DRAWINGS

FIG. 3 is a configuration diagram of the code word table prediction table contained in the mode data coding section;

FIG. 5 is a diagram showing the coding modes of a block to be coded and peripheral blocks;

FIG. 6 is a diagram showing the pixel value status of each block in one frame;

FIG. 7A is a diagram showing code words when the blocks shown in FIG. 6 are image-coded according to the present invention;

FIG. 7B is a diagram showing code words when the blocks shown in FIG. 6 are image-coded according to a general coding system;

FIG. 11 is a configuration diagram of the code word table provided for the image coding system in the third embodiment;

FIG. 12 is a diagram showing an example of the pixel value status of each block with respect to an image to be coded;

FIG. 13A is a diagram showing code words when the block in FIG. 12 is image-coded according to the present invention;

FIG. 13B is a diagram showing code words when the block in FIG. 12 is image-coded according to a general coding system;

BEST MODE FOR CARRYING OUT THE INVENTION

With reference now to the attached drawings, the embodiments of the present invention are explained in detail below:
(First embodiment)

Figure 1:
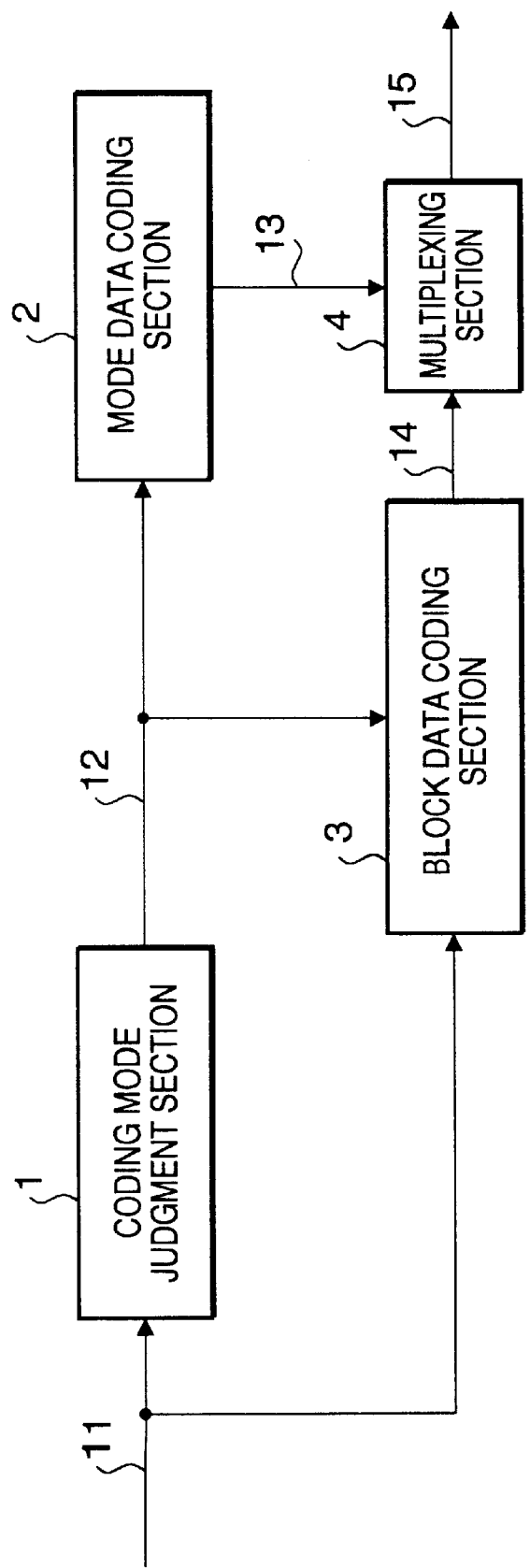
FIG. 1 is a block diagram of the image coding system that relates to the first embodiment of the present invention.

FIG. 1 shows a block diagram of the image coding system that constitutes the first embodiment of the present invention. The image coding system shown in said figure comprises coding mode judgment section 1 that outputs the coding mode data which indicates the coding mode of a pixel block to be coded, mode data coding section 2 that generates mode data code words using a code word table which will be described later, block data coding section 3 that generates a code word for the pixel value within the pixel block, and multiplexing section 4 that generates a coded image signal by multiplexing the code word regarding the mode data and the code word regarding the pixel value data. Here, code 11 indicates a pixel value signal of a block of a digital input image divided by the block division block which is not shown in the figure; code 12 indicates the coding mode data of the pixel block; code 13 indicates the code word regarding the mode data; code 14 indicates the code word regarding the block data; code 15 indicates a coded image signal of the digital input image divided into blocks.

Figure 2:
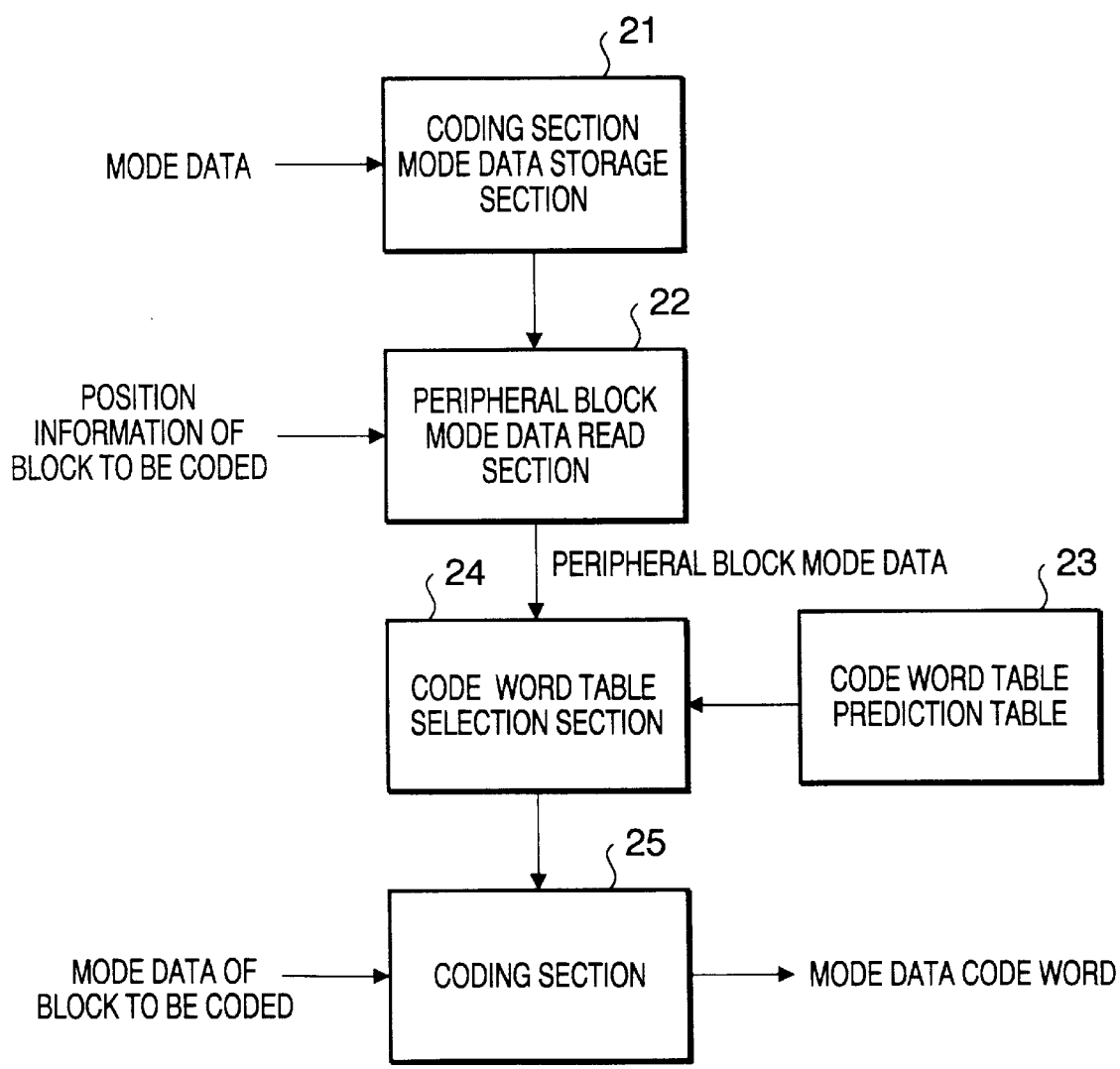
FIG. 2 is a functional block diagram of the mode data coding section provided in the image coding system in the first embodiment.

FIG. 2 shows the functional block configuration of mode data coding section 2. As shown in FIG. 2, mode data coding section 2 comprises mode data storage section 21 that stores coding mode data, mode data read section 22 that reads coding mode data of blocks peripheral to the block to be coded, code word table prediction table 23 consisting of a plurality of code word tables, code word table selection section 24 that selects the optimal code word table, and coding section 25 that codes mode data based on the code word table.

FIG. 3 shows an actual example of code word table prediction table 23. It is designed that the coding efficiency may be improved by adjusting a combination of the mode data of the already coded peripheral blocks and a plurality of code word tables which contain different coding patterns.

Figure 4:
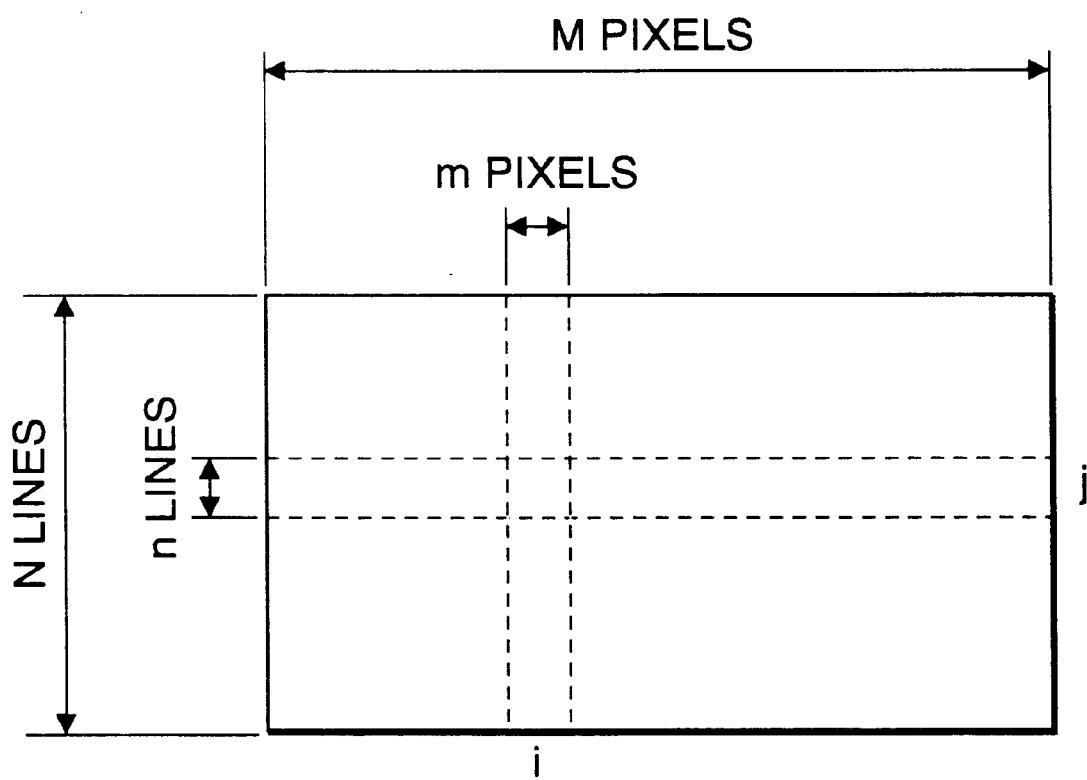
FIG. 4 is a diagram showing how a frame image is divided into sections.

The operation of the image coding system configured above is explained below:

Firstly, the digital input image, as shown in FIG. 4, constitutes form information that indicates the form or the ratio of synthesis of a normal color signal or object wherein one frame is configured from horizontal M pixels and vertical N lines. The one-frame digital input image is divided into a plurality of pixel blocks made up of horizontal m pixels and vertical n lines by the block division block which is not shown in the figure. Pixel value signal 11 of the resulting pixel blocks is input to coding mode judgment section 1 and block data coding section 3.

Coding mode judgment section 1 determines the coding mode of that pixel block from the pixel value data of the pixel block at position (i,j) (hereafter described as POS (i,j)). In the case of a normal color signal, the presence or absence of movement correction and the presence or absence of quadrature conversion coefficient are determined, and in the case of a form signal, the presence or absence of a significant form is determined. In the case of a binary image signal, there can be three statuses: (A) all pixels in the block are black pixels; (B) all pixels are white pixels; (C) black pixels and white pixels are mixed. Therefore, there are three coding modes A, B, and C corresponding to three statuses, respectively. The coding mode of the pixel block at POS (i,j) is described hereafter as MODE (i,j). Coding mode judgment section 1 outputs determined MODE (i,j) to mode data coding section 2 and block data coding section 3.

Mode data coding section 2 selects the code word table corresponding to MODE (i,j) from the code word table prediction table shown in FIG. 3 to generate a code word regarding the mode data.

The method of coding the mode data is explained in detail below:

In mode data coding section 2, supposing that the coding mode of the pixel block now to be coded is MODE (i,j), it is possible to predict MODE (i,j) from coding modes MODE (i−1, ), MODE (i−1,j−1) and MODE (i,j−1) of the already coded pixel blocks (POS (i−1,J−1), POS (i,j−1), POS (i−1,j)) peripheral to the pixel block at POS (i,j) as shown in FIG. 5.

That is, when there are three coding modes A, B, and C. in the case that MODE (i−1,j), MODE (i−1,j−1), and MODE (i,j−1) are all A, there is a high probability that MODE (i,j) will also be A.

In typical conventional mode data coding, a specific code word is provided for each of coding modes A, B and C and a code word is assigned according to the coding mode determined. That is, only one set of the code word of coding mode A, code word of coding mode B and code word of coding mode C is prepared beforehand (code word table) and the code word for the corresponding coding mode is extracted and output. In addition to that, the length of each code word is fixed at the same length (number of bits).

As shown in FIG. 3, in the present invention, a plurality of code word tables are provided in the code word table prediction table and some specific code word tables include code words of a short code word length. In the case that the coding mode of blocks peripheral to the block to be coded is inclined toward a specific mode, there is a high probability of the block to be coded being the same as the specific mode, and thus the code word of the specific mode is set shorter than the code word of other coding modes.

To be concrete, in the case that the coding mode of the peripheral blocks is inclined toward A, the code word of coding mode A is set to "0" (code word length =1 bit); the code word of coding mode B is set to "10" (code word length=2 bits); and the code word of coding mode C is set to "11" (code word length=2 bits). In the case that numerous B's are included in the coding mode of the peripheral blocks or in the case that numerous C's are included in the coding mode of the peripheral blocks, the code word length of the respective dominant coding modes is set shorter.

Mode data coding section 2 stores the mode data sent from coding mode judgment section 1 in mode data storage section 21 to make it easy to acquire the coding mode information of the blocks peripheral to the block to be coded. The mode data of the pixel block is stored in the position corresponding to said block within one frame.

When block position POS (i,j) of the block to be coded is input, mode data read section 22 reads coding modes MODE (i−1,j), MODE (i−1, j−1), and MODE (i,j−1) at block positions POS (i−1,j−1), POS (i,j−1), POS (i−1,j) from mode data storage section 21 and gives them to code word table selection section 24.

Code word table selection section 24 selects the code word table set in association with a combination that matches the combination of coding modes MODE (i−1,j), MODE (i−1,j−1), and MODE (i,j−1) of the peripheral blocks from code word table prediction table 23. For example, in the case that the coding modes of the peripheral blocks are (A,A,A), (A,A,B), (A,A,C), (B,A,A), (C,A,A), (A,B,A), or (A,C,A), the code word table of (A=0, B=10, C=11) is selected. The example above is the case where coding mode A of the peripheral blocks is dominant. In the case that coding mode B of the peripheral blocks is dominant, the code word table of (A=10, B=0, C=11) is selected, and in the case that coding mode C of the peripheral blocks is dominant, the code word table of (A=10, B=11, C=0) is selected. The code word table selected according to the mode statuses of peripheral blocks is given to coding section 25.

Thus, the present invention allows the code word table used for coding of mode data to be switched adaptively according to the coding mode statuses of peripheral blocks.

Coding section 25 codes the mode data of the block to be coded based on the selected code word table. Now, in the case that the coding mode input from coding mode judgment section 1 is A and the code word table input from code word table selection section 24 is (A=0, B=10, C=11), code word=0 is output.

Therefore, in the case that blocks peripheral to the block to be coded includes a dominant mode and the mode of the block to be coded matches the dominant mode, a short code word is generated.

Suppose that the coding mode status of each pixel block of a frame image is as shown in FIG. 6. If the code word table can be changed adaptively according to the coding mode statuses of peripheral blocks as in the case of the present invention, the code word length of the hatched block in FIG. 7A becomes shorter, and thus the coding efficiency can be improved. On the other hand, in the case that a frame image as shown in FIG. 6 is coded using the code word table with only one set of (A=0, B=10, C=11) fixed, the coding result will be as shown in FIG. 7B. It is observable that the coding efficiency is reduced compared to the code word shown in FIG. 7A.

If A or B is input as the coding mode regarding the pixel block at POS (i,j) from coding mode judgment section 1, block data coding section 3 stops coding of the pixel value of the block to be coded. This is because in the case of coding modes A and B, all pixels in the block are black or white and therefore decoding of the pixel block is possible with only the mode data. In the case of coding mode C, the pixel value of the block to be coded is coded and the code word regarding the block data is output.

Multiplexing section 4 multiplexes the code word regarding the mode data with the code word regarding the block data to output a coded image signal.

As seen above, the present embodiment provides a plurality of code word tables to convert individual mode data to a code word in association with the coding mode statuses of peripheral blocks and assigns short code words to a dominant mode prevailing in the peripheral blocks, thus allowing the code word tables to be switched adaptively according to the coding mode statuses of peripheral blocks.

On the other hand, instead of handing over the content of the code word table selected by code word table selection section 24 to coding section 25, it is also possible to notify only the number of the selected code word table to coding section 25 so that coding section 25 may incorporate the content of the code word table specified with a number from code word table prediction table 23.

(Embodiment 2)

Figure 8:
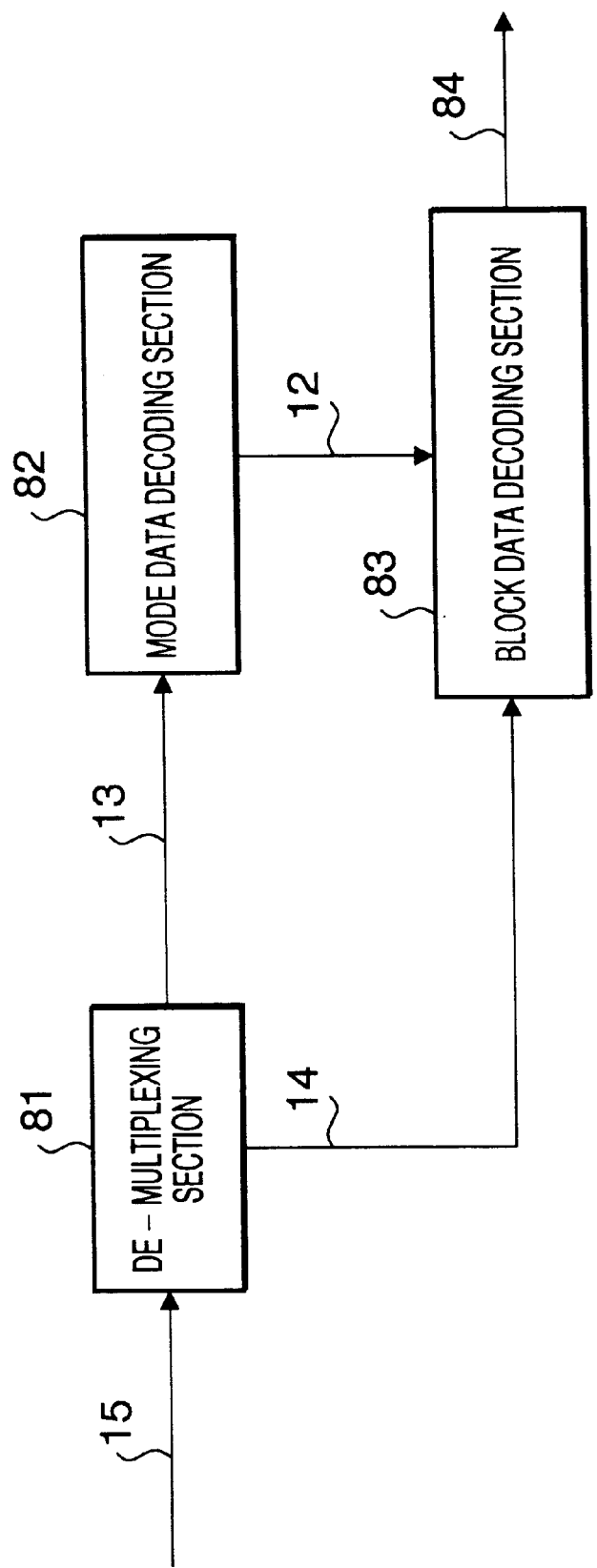
FIG. 8 is a block diagram of the image decoding system of the second embodiment of the present invention.

FIG. 8 is a block diagram of the image decoding system that relates to the second embodiment of the present invention. In said figure, the same signals as those in the first embodiment shown in FIG. 1 are assigned the same numbers and their explanations are omitted here.

This image decoding system comprises de-multiplexing section 81 that separates the code word regarding the mode data and the code word regarding the block data from the coded image signal, mode data decoding section 82 that reproduces the coding mode data of the pixel block from the code word regarding the mode data, and block data decoding section 83 that reproduces the pixel value within the pixel block in the mode indicated by the reproduced mode data.

Figure 9:
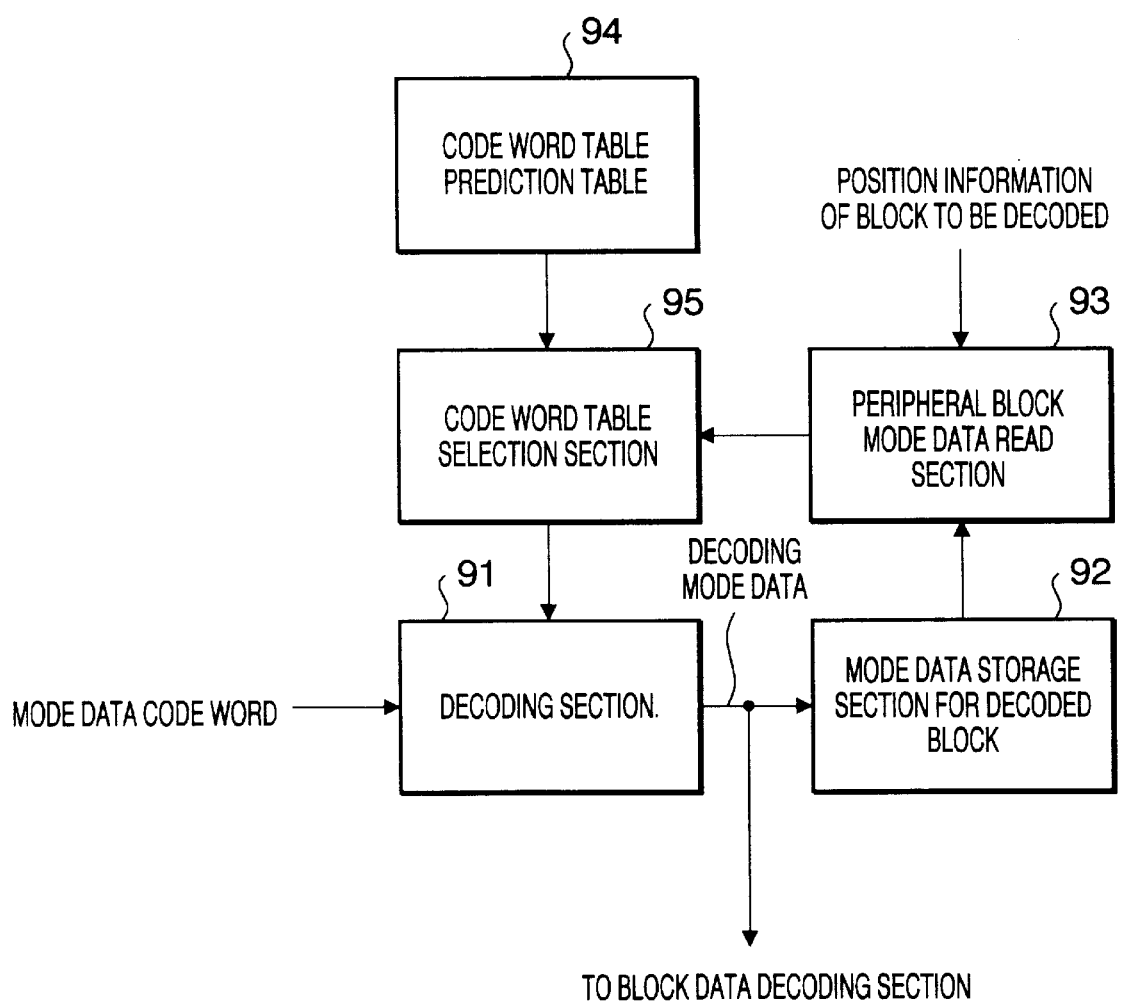
FIG. 9 is a functional block diagram of the mode data decoding section provided in the image decoding system in the second embodiment.

FIG. 9 is a functional block diagram of mode data decoding section 82. Mode data decoding section 82, comprises decoding section 91 that decodes the code word of the mode data, mode data storage section 92 that stores the mode data of the decoded pixel block, mode data read section 93 that reads the stored mode data, code word table prediction table 94 that combines the mode statuses of peripheral blocks viewed from the block to be decoded and code word tables, and code word table selection section 95 that selects a code word table.

If the code word of the mode data coded by mode data coding section 2 in the first embodiment is decoded by the image decoding system in the present embodiment, it is necessary to use code word table prediction table 94 with the same content as that shown in FIG. 3.

The operation of the image decoding system in the second embodiment configured as shown above is now explained below.

Firstly, de-multiplexing section 81 separates coded image signal 15 into code word 13 regarding the mode data and code word 14 regarding the block data. Code word 13 regarding the mode data is input to mode data decoding section 82, while code word 14 regarding the block data is input to block data decoding section 83.

Upon receiving code word 13 regarding the mode data, mode data decoding section 82 reproduces coding mode data 12 of the corresponding block from code word table prediction table 94.

With reference now to FIG. 9, the operation of mode data decoding section 82 is explained. After decoding section 91 decodes the code word of mode data, the decoded mode data is written to the corresponding pixel block position of mode data storage section 92.

In mode data read section 93, position information within one frame of the block to be decoded is input. Mode data read section 93 reads the mode data of the decoded blocks peripheral to the block to be decoded from mode data storage section 92 based on the position information of the block to be decoded and inputs it to code word table selection section 95.

Code word table selection section 95 extracts the same code word table as the code word table at the time of coding from code word table prediction table 94 based on the mode data statuses of the blocks peripheral to the block to be decoded. The code word table extracted from code word table prediction table 94 is handed over to decoding section 91.

Decoding section 91 decodes the code word regarding the mode data of the block to be decoded using the code word table handed over from code word table selection section 95.

For example, supposing that the block to be decoded by mode data decoding section 82 is a block at POS (i,j), MODE (i−1,j), MODE (i−1,j−1), and MODE (i,j−1) shown in FIG. 5 have already been reproduced, and it is possible to correctly reproduce the coding mode of the block MODE (i,j) from the code word regarding the mode data coded in the first embodiment by switching the code word table from the statuses of modes MODE (i−1,j), MODE (i−1,j−1), and MODE (i,j−1) according to FIG. 3.

The decoded mode data is stored in mode data storage section 92 and at the same time input to block data decoding section 83.

Block data decoding section 83 receives code word 14 regarding the block data and reproduces digital pixel value signal 31 within the block and outputs it by performing decoding processing corresponding to the coding mode shown in coding mode data 12.

In the first and second embodiments above, the mode data of three peripheral blocks was used to predict the mode data of the block to be coded, but it is also possible to increase the number of reference blocks.

The embodiment above describes the case where there are 3 kinds (A, B, C) of mode data, but it is also possible to apply the similar processing to more statuses.

Combining the image coding system in the first embodiment and the image decoding system in the second embodiment will allow a coding/decoding system to be implemented.

(Third embodiment)

Figure 10:
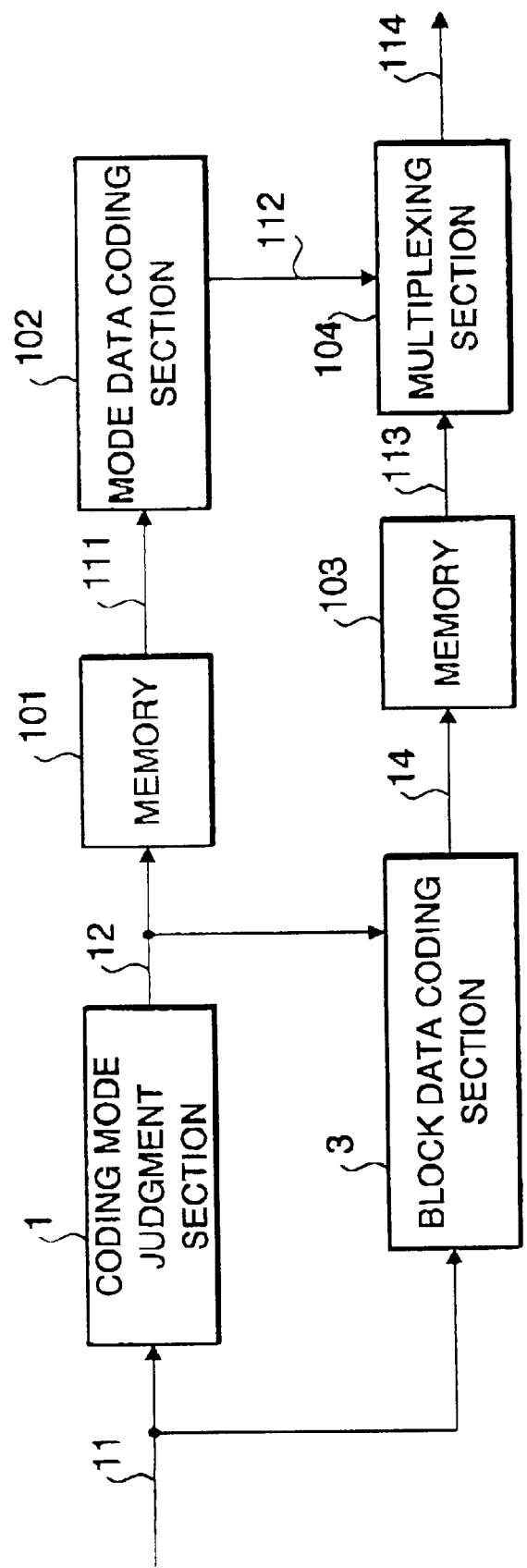
FIG. 10 is a block diagram of the image coding system of the third embodiment of the present invention.

FIG. 10 shows a block diagram of the image coding system that relates to a third embodiment of the present invention. In said figure, the same functional blocks and same signals as those of the system shown in FIG. 1 are assigned the same numbers and their explanations are omitted.

The image coding system in the present embodiment comprises coding mode judgment section 1, memory 101 that stores coding mode data output from coding mode judgment section 1 for each block and outputs one-frame data together, mode data coding section 102 that codes one-frame coding mode data together to create code words, block data coding section 3, memory 103 that stores the code word regarding the block data for each block and outputs one-frame data together, and multiplexing section 104 that multiplexes the code word regarding one-frame mode data with the code word regarding the block data of each pixel block within the same frame to generate a coded image signal. Code 111 indicates one-frame coding mode data; 112, the code word regarding one-frame mode data; 113, the code word regarding one-frame block data; and 114, the coded image signal of a digital input image.

The operation of the image coding system in the present embodiment configured above is explained below:

Firstly, for digital input image signal 11, coding mode MODE (i,j) of the block at POS (i,j) is determined by coding mode judgment section 1 as in the case of the first embodiment. The determined MODE (i,j) is stored in memory 101. When mode data MODE (1,1), MODE (1,2), . . . MODE (2,1), . . . MODE (X,Y) of all the pixel blocks corresponding to one frame are stored, all the mode data is transferred to mode data coding section 102 at a time.

Mode data coding section 102 codes one-frame mode data using the code word table shown in FIG. 11. The coding operation of mode data coding section 102 is explained in detail below.

Mode data coding section 102 has a code word table (shown in FIG. 11) to encode mode data of a plurality of blocks collectively. In this code word table, a specific code word is assigned to each of all pairs of 3 kinds of mode (A, B, C). Especially for combinations of the same modes (A,A) (B,B), and (C,C), the code word length is designed to be relatively shorter than other combinations.

Now, suppose that one-frame mode data with the content as shown in FIG. 12 is transferred to mode data coding section 102.

Mode data is sequentially extracted from the start of the line 2 blocks at a time. In the case of FIG. 12, mode data will be coded two consecutive data items in horizontal direction at a time in order of (A,B), (B,B), and (A,A).

FIG. 13A shows the result of coding the one-frame mode data shown in FIG. 12 using the code word table shown in FIG. 11. It is observable that the area where one combination of the same modes appears after another contains short code words. FIG. 13B shows the result of coding the one-frame mode data shown in FIG. 12 using a fixed code word table such as A=0, B=10, C=1 as in the case of the previous comparison example. As clearly seen from a comparison of FIG. 13A and FIG. 13B, the number of bits of the code word of one-frame mode data in the coding system of the present invention is less than that in conventional coding systems.

Mode data code word 112 coded in this way is given to multiplexing section 104.

On the other hand, the pixel data of the pixel block is coded by block data coding section 3 as in the case of the first embodiment, and the code word regarding the block data is stored in memory 103 and organized into code word 113 regarding the block data corresponding to the entire one frame.

Then, multiplexing section 104 multiplexes code word 112 regarding the mode data and code word 113 regarding the block data of the entire one frame and outputs coded image signal 114.

Thus, the third embodiment stores the mode data of one-frame pixel block in memory before coding a plurality of mode data items collectively. In the code word table to encode a plurality of mode data items collectively, shorter code words are set for combinations of the same mode data.

(Fourth embodiment)

Figure 14:
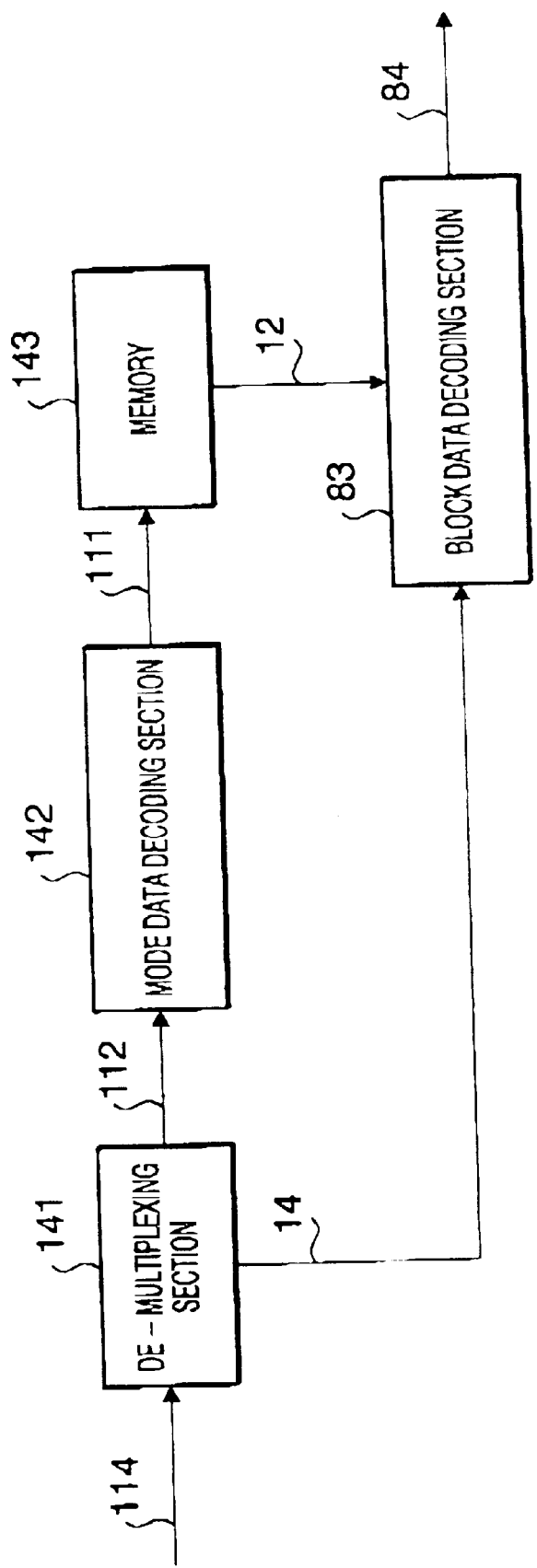
FIG. 14 is block diagram of the image decoding system that relates to the fourth embodiment of the present invention.

FIG. 14 is a block diagram of the image decoding system that relates to a fourth embodiment of the present invention. In said figure, the same signals as those shown in FIG. 1 and FIG. 8 are assigned the same numbers and their explanations are omitted.

The image decoding system of the present embodiment comprises de-multiplexing section 141 that separates a code word string regarding the mode data and a code word string regarding the block data from a coded signal, mode data decoding section 142 that obtains mode data from a code word string regarding the mode data, memory 143 that stores mode data of all blocks corresponding to one frame, and block data decoding section 83 that reproduces pixel values from a code word string regarding the block data.

Mode data decoding section 142 has a code word table shown in FIG. 11 to decode the code word of the mode data coded by the image coding system in the third embodiment. Mode data decoding section 142 decodes the code word of the mode data using the code word table in FIG. 11.

The operation of the image decoding systems in the fourth embodiment configured above is explained below:

Firstly, de-multiplexing section 141 receives coded signal 114, separates and outputs coded signal 114 to the code word string regarding the mode data of all blocks corresponding to one frame and the code word string regarding the block data of each block.

Mode data decoding section 142 decodes the code word of the mode data into mode data of two pixel blocks using the code word table in FIG. 11 in a procedure opposite to the coding procedure in the third embodiment. Mode data 111 decoded by mode data decoding section 142 is stored in memory 143 and its one-frame data is output together to block data decoding section 83.

The mode data of all blocks within one frame decoded by mode data decoding section 142 is stored in memory 143 and mode data MODE (i,j) of the block to be reproduced is given to block data decoding section 83 in accordance with a request from block data decoding section 83.

Lastly, block data decoding section 83 receives code word string 14 regarding the block data of the block at position POS (i,;) separated and output by de-multiplexing section 141 and mode data MODE (i,j) of the block output from memory 143 and reproduces and outputs pixel values in the block in accordance with MODE (i,j).

Furthermore, an appropriate sorting block which is not shown in the figure reproduces the digital image signal by sorting the pixel values for each block output in the scanning order.

In the third and fourth embodiments above, mode data items of two continuous pixel blocks were coded together, but it is also possible to encode mode data items of numerous pixel blocks together. Further, a plurality of continuous pixel blocks in horizontal direction are coded, but it is also possible to encode a plurality of continuous pixel blocks in vertical direction or continuous pixel blocks in two-dimensional directions together. This requires a code word table corresponding to the combination of blocks to be coded together.

(Fifth embodiment)

The first to fourth embodiments above describe coding of mode data using the code word table shown in FIG. 3 or FIG. 4, but it is also possible to use other coding techniques such as arithmetic coding technique.

In the image coding/decoding system that relates to a fifth embodiment, a mode data coding section/mode data decoding section performs coding/decoding using an arithmetic coding technique and switches probability models used for arithmetic coding/decoding by predicted values of the mode data of the block to be coded/decoded. The configuration except the mode data coding section/mode data decoding section is the same as the above-mentioned embodiments.

In arithmetic coding, the data series to be coded is mapped on a probability number line divided according to the appearance probability of dominant symbols and inferior symbols and their positions are expressed in binary point values and output as code series.

Figures 15, 16:
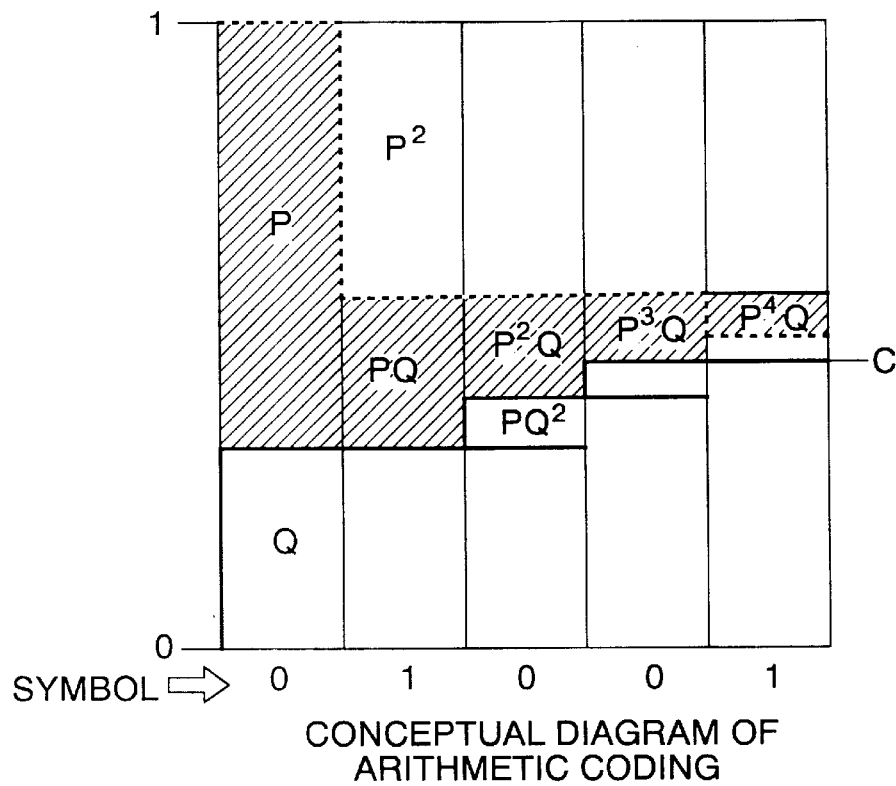
FIG. 15 is a conceptual diagram of the arithmetic coding method.
FIG. 16 is a configuration diagram of the appearance probability table used in the fifth embodiment of the present invention.

FIG. 15 shows a conceptual diagram of arithmetic coding.

This figure presents a case where data series S={010011 . . . } is coded with "P" indicating the appearance probability of "0" and "Q" indicating the appearance probability of "1". The position of "C" on the probability number line indicates the code corresponding to data string "S". In such coding, code "C" is determined by the following coding rules.

<Coding rules>

When data is 0 (dominant symbol)

C←C+A*Q

A←A*P

When data is 1 (inferior symbol)

A←A*Q

"A" is an which indicates the range of the existence of codes and corresponds to the hatching area in FIG. 15.

Appearance probabilities P and Q are the probability models and correspond to the code word tables. A conventional arithmetic coding technique often uses fixed probability models. If three kinds of data items A, B, and C are coded/decoded as shown in the embodiment above, three types of appearance probability are also required.

The present embodiment performs arithmetic coding/decoding using a probability model table in which a plurality of probability models (No 1 to No 3) are set as shown in FIG. 16. The probability model table is a table showing the correspondence between a combination of modes of a plurality of pixel blocks and probability model as in the case of the code word table prediction table shown in FIG. 3. The combination of modes is the same as that shown in FIG. 3 and is not illustrated here, but the model number corresponds to the combination of modes. Appearance probability of each mode making up the probability model is set in such a way that if there are numerous specific modes in the peripheral blocks, the appearance probability for those modes is relatively high.

When a fixed probability model is used, the code word length of inferior symbols becomes longer, and therefore in the case that an image that contains numerous inferior symbols is coded, the coding efficiency is reduced.

The present embodiment predicts the mode of the block to be coded from the modes of peripheral blocks and performs coding using a probability model with the appearance probability of the predicted mode set higher, making it possible to improve the coding efficiency.

(Sixth embodiment)

The present invention implements the configurations shown in the first to fifth embodiments by software or programming and allowing another independent computer system to easily implement them by transferring them recorded in a recording medium such as a floppy disk.

If a computer system incorporates a function equivalent to coding mode judgment section 1, a function equivalent to block data coding section 3, a function equivalent to multiplexing sections 4 and 104 and an existing mode data coding function, it is also possible to replace the program implementing mode data coding sections 2 and 102 by another program implementing an existing mode data coding function. In this case, only the program implementing mode data coding sections 2 and 102 or the program implementing program replacement processing is stored in a recording medium and carried.

Figure 17:
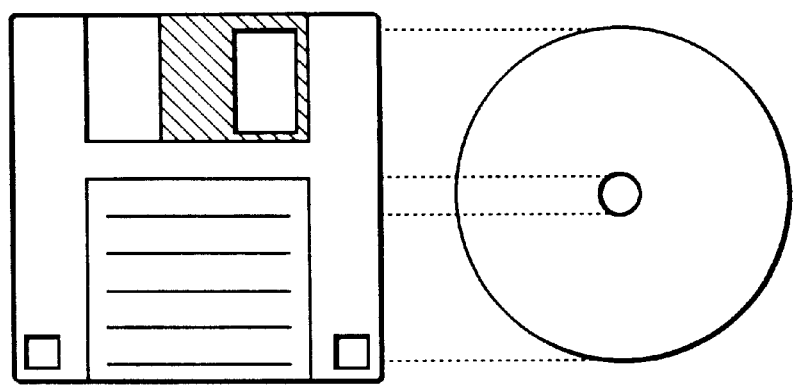
FIG. 17 is a schematic view of the recording medium that stores the image coding/decoding program that relates to the sixth embodiment of the present invention.

FIG. 17 shows a floppy disk as an example of recording medium.

In this embodiment, a floppy disk is shown as a recording medium, but any IC card, CD-ROM, magnet tape and whatever capable of recording the program can be used likewise.

Figure 18:
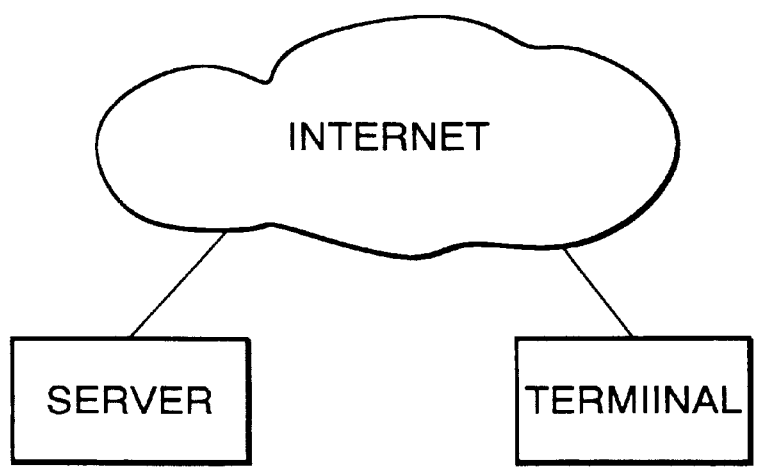
FIG. 18 is a schematic diagram of the network that distributes the image coding/decoding program of the present invention.

Furthermore, as a method of downloading the program above to a computer system, it is also possible to download the program from a server device to a terminal device via the Internet or other communication network as shown in FIG. 18.

The present invention is not limited only to the above mentioned embodiments, but can be modified in various ways as long as they are not deviated from the purpose of the present invention and those are included in the range of the present invention.

Industrial Applicability

As described above, the present invention is useful for image coding systems or image decoding systems which perform coding or decoding by dividing a digital image into blocks and separating block coding mode and block data for each block, and suited to improving the coding efficiency of code words regarding to the coding mode and coding the input images with fewer bits.

What is claimed:

1. An image coding method of coding each block of a digital image divided into a plurality of two-dimensional blocks, each block having a plurality of pixels, said method comprising:

determining a coding mode for a target block to output mode information of the target block;

coding the mode information of the target block using the mode information of previously coded blocks at the periphery of the target block; and coding pixel data in the target block according to the mode information of the target block wherein the coding mode is determined based on whether pixel values in the block are all 0, all 1 or other than all 0 and all 1.

2. An image coding method of coding each block of a digital image divided into a plurality of two-dimensional blocks, each block having a plurality of pixels, said method comprising:

determining a coding mode for a target block to output mode information of the target block;

fetching and outputting a codeword of the mode information of the target block from a codeword table, based on a combination of the mode information of the target block and the mode information of previously coded blocks at the periphery of the target block, said codeword table having codewords, each codeword of said table being determined based on the combination of the mode information of the target block and the mode information of the previously coded blocks at the periphery of the target block; and coding pixel data in the target block according to the mode information of the target block.

3. An image coding method of coding each block a digital image divided into a plurality of two-dimensional blocks, each block having a plurality of pixels, said method comprising:

determining a coding mode for a target block to output mode information of the target block;

outputting, a codeword of the mode information of the target block, the codeword being determined based on a combination of the mode information of the target block and the mode information of previously coded blocks at the periphery of the target block, the codeword being assigned a shorter codeword length when the coding mode for the target block is numerically predominant among coding modes of the blocks at the periphery of the target block than when the coding mode for the target block is numerically inferior among the coding modes of the blocks at the periphery of the target block; and coding pixel data in the target block according to the mode information of the target block.

4. An image coding apparatus that codes each block of a digital image divided into a plurality of two-dimensional blocks, each block having a plurality of pixels, said apparatus comprising:

a coding mode determining section that determines a coding mode for a target block to output mode information of the target block;

a mode information coding section that codes the mode information of the target block using the mode information of previously coded blocks at the periphery of the target block; and a block data coding section that codes pixel data of the target block according to the mode information of the target block;

wherein said coding mode determining section determines the coding mode based on whether pixel values in the block are all 0, all 1 or other than all 0 and all 1.

5. An image coding apparatus that codes each block of a digital image divided into a plurality of two-dimensional blocks, each block having a plurality of pixels, said apparatus comprising:

a coding mode determining section that determines a coding mode for a target block to output mode information of the target block;

a codeword table containing codewords, each codeword being determined in association with a combination of the mode information of the target block and the mode information of previously coded blocks at the periphery of the target block;

a mode information coding section configured to fetch and output a codeword of the mode information of the target block from said codeword table, based on the combination of the mode information of the target block and mode information of previously coded blocks at the periphery of the target block, and a block data coding section that codes pixel data in the target block according to the mode information of the target block.

6. An image coding apparatus that codes each block of a digital image divided into a plurality of two dimensional blocks, each block having a plurality of pixels, said apparatus comprising:

a coding mode determining section that determines a coding mode for a target block to output mode information of the target block;

a mode information coding section that outputs a codeword of the mode information of the target block, the codeword being determined based on a combination of mode information of the target block and the mode information of previously coded blocks at the periphery of the target block, the codeword being assigned a shorter codeword length when the coding mode for the target block is numerically predominant among coding modes for the blocks at the periphery of the target block, than when the coding mode for the target block is numerically inferior among the coding modes for the blocks at the periphery of the target block: and a block data coding section that codes pixel data in the target block according to the mode information of the target block.

7. A computer readable recording medium with an image coding program stored therein, said program being executed by a computer to execute procedures for coding each block of a digital image divided into a plurality of two-dimensional blocks, each block having a plurality of pixels, said program comprising:

determining a coding mode for a target block to output mode information of the target block;

fetching and outputting a codeword of the mode information of the target block from a codeword table, based on a combination of the mode information of the target block and the mode information of previously coded blocks at the periphery of the target block, said codeword table having codewords determined based on the combination of the mode information of the target block and the mode information of the previously coded blocks at the periphery of the target block; and coding pixel data in the target block according to the mode information of the target block.

* * * * *